United States Patent
Horibe

(10) Patent No.: US 9,496,562 B2
(45) Date of Patent: Nov. 15, 2016

(54) ELECTRODE ASSEMBLY FOR SOLID POLYMER FUEL CELL

(71) Applicant: Nissan Motor Co., Ltd., Kanagawa (JP)

(72) Inventor: Norifumi Horibe, Kanagawa (JP)

(73) Assignee: Nisson Motor Co., Ltd., Kanagawa (JP)

( * ) Notice: Subject to any disclaimer, the term of this patent is extended or adjusted under 35 U.S.C. 154(b) by 296 days.

(21) Appl. No.: 14/376,932

(22) PCT Filed: Mar. 12, 2013

(86) PCT No.: PCT/JP2013/056780
§ 371 (c)(1),
(2) Date: Aug. 6, 2014

(87) PCT Pub. No.: WO2013/137240
PCT Pub. Date: Sep. 19, 2013

(65) Prior Publication Data
US 2015/0010846 A1    Jan. 8, 2015

(30) Foreign Application Priority Data
Mar. 14, 2012  (JP) .................. 2012-056992

(51) Int. Cl.
*H01M 8/02* (2016.01)
*H01M 4/86* (2006.01)
*H01M 8/10* (2016.01)

(52) U.S. Cl.
CPC ......... *H01M 8/0273* (2013.01); *H01M 4/8657* (2013.01); *H01M 8/0232* (2013.01); *H01M 8/0271* (2013.01); *H01M 8/0284* (2013.01); *H01M 8/1004* (2013.01); *H01M 8/103* (2013.01); *H01M 8/1023* (2013.01); *H01M 8/1025* (2013.01); *H01M 8/1027* (2013.01); *H01M 8/1032* (2013.01);

(Continued)

(58) Field of Classification Search
None
See application file for complete search history.

(56) References Cited

U.S. PATENT DOCUMENTS 6,037,072 A * 3/2000 Wilson ................ H01M 8/0206
                                                       429/465
6,270,636 B1 * 8/2001 Byron, Jr. ................ C25B 9/00
                                                       204/252

(Continued)

FOREIGN PATENT DOCUMENTS

JP        3052536 B2    4/2000
JP     2005-293944 A   10/2005

(Continued)

OTHER PUBLICATIONS

International Search Report for corresponding International Application No. PCT/JP2013/056780, mailed Apr. 23, 2013 (2 pages).

*Primary Examiner* — Jonathan Crepeau
(74) *Attorney, Agent, or Firm* — Osha Liang LLP

(57) ABSTRACT

A membrane electrode assembly for a polymer electrolyte fuel cell has a laminate having a polymer electrolyte membrane with catalyst layers on both sides, gas diffusion layers that hold the polymer electrolyte membrane between the gas diffusion layers, and a first plastic film that covers a rim portion of the polymer electrolyte membrane, the catalyst layers and the gas diffusion layers, metal porous bodies disposed on both entire faces of the laminate, and a second plastic film that further covers a rim portion of the laminate and the metal porous bodies that are laminated together. Rim portions of the metal porous bodies are held between the first plastic film and the second plastic film.

11 Claims, 3 Drawing Sheets

(52) U.S. Cl.
CPC .. *H01M 8/1039* (2013.01); *H01M 2008/1095* (2013.01); *H01M 2250/20* (2013.01); *Y02E 60/521* (2013.01); *Y02T 90/32* (2013.01)

(56) References Cited

U.S. PATENT DOCUMENTS

| | | | |
|---|---|---|---|
| 6,716,550 B1* | 4/2004 | Kirby | H01M 8/0271 429/131 |
| 2005/0221145 A1* | 10/2005 | Leonida | H01M 2/08 429/510 |
| 2008/0090131 A1 | 4/2008 | de Rouffignac et al. | |
| 2010/0143808 A1 | 6/2010 | Nagano et al. | |
| 2012/0122012 A1 | 5/2012 | Hasegawa | |

FOREIGN PATENT DOCUMENTS

| | | |
|---|---|---|
| JP | 2006-216294 A | 8/2006 |
| JP | 2008-515137 A | 5/2008 |
| JP | 2010-272474 A | 12/2010 |
| JP | 2008-071542 A | 3/2014 |
| WO | 2008/153200 A1 | 12/2008 |
| WO | 2011/016493 A1 | 2/2011 |

* cited by examiner

US 9,496,562 B2

ELECTRODE ASSEMBLY FOR SOLID POLYMER FUEL CELL

BACKGROUND

1. Technical Field

The present invention relates to a membrane electrode assembly used for a power generation component of polymer electrolyte fuel cells (PEFCs) and a polymer electrolyte fuel cell using the membrane electrode assembly.

2. Related Art

Polymer electrolyte fuel cells using a proton conductive polymer membrane are being put into practice as a power source of mobile objects such as cars, since they can operate at a low temperature (ambient temperature) compared to the other fuel cells such as solid oxide fuel cells and molten carbonate fuel cells.

Such polymer electrolyte fuel cells (hereinafter also abbreviated as "PEFCs") are typically configured such that a plurality of single cells each having a power generating function are stuck together.

Each single cell includes a membrane electrode assembly (MEA) that includes a proton-conductive polymer electrolyte membrane (e.g. NAFION (registered trademark) membrane), a pair of anode and cathode electrode layers (also referred to as "electrode catalyst layers") that hold the polymer electrolyte membrane between them, and a pair of anode and cathode gas diffusion layers which hold the electrolyte membrane and the electrode layers between them. The gas diffusion layers (hereinafter also abbreviated as "GDLs") are typically made of a carbon paper or a carbon cloth.

The membrane electrode assembly (hereinafter, also abbreviated as the "MEA") of each single cell is electrically connected to the MEA of the adjacent single cell via a separator. The single cells are laminated and connected to each other in this way to form a fuel cell stack. Such fuel cell stacks are used for a variety of purposes as power generating means.

While various types of membrane electrode assemblies are known in the art, the above-described polymer electrolyte membranes fundamentally lack strength. To prevent breakage by a stress, which is caused by a pressure difference between fuel gas and oxidant gas, a thermal strain of the surrounding members and the like, and to prevent resultant gas mixing (cross leak), a variety of proposals have been made. For example, Patent Document 1 discloses a technique of coating the rim portion of electrodes and the outer rim of an electrolyte membrane with a reinforcing film made of fluororesin, polypropylene etc. in order to compensate for lack of strength at the outer rim of the polymer electrolyte membrane where the electrodes (gas diffusion electrodes) are not disposed.

CITATION LIST

Patent Literature

Patent Document 1: Japanese Patent No. 3052536

SUMMARY OF INVENTION

However, the invention described in the above document cannot improve the strength or rigidity of the MEA itself while it can provide reinforcement of the exposed part of the electrolyte membrane from the electrodes, i.e. the most fragile portion of the MEA. If the whole MEA is subjected to an excessive stress, it may break the electrolyte membrane.

One or more embodiments of the present invention provides a membrane electrode assembly with high strength and high rigidity without increasing the thickness or degrading the gas permeability of a gas diffusion layer, and to provide a polymer electrolyte fuel cell using such membrane electrode assembly.

One or more embodiments of the present invention includes disposing metal porous bodies that serves as a part of GDLs on both entire surfaces of an MEA, and covering the rim portion thereof by a plastic film.

The present invention is based on the above findings, and a membrane electrode assembly for a polymer electrolyte fuel cell of the present invention includes: a laminate including a polymer electrolyte membrane with catalyst layers on both sides, gas diffusion layers that hold the polymer electrode membrane between the gas diffusion layers, and a first plastic film that covers a rim portion of the polymer electrolyte membrane, the catalyst layers and the gas diffusion layers; metal porous bodies disposed on both entire faces of the laminate; and a second plastic film that further covers a rim portion of the laminate and the metal porous bodies that are laminated together. Further, a polymer electrolyte fuel cell of the present invention comprises the above-described membrane electrode assembly of the present invention.

According to the present invention, the metal porous bodies such as metal meshes are disposed on the surfaces of the gas diffusion layers that hold the polymer electrolyte membrane with the catalyst layers on both sides between them, and the rim portion thereof is covered with the plastic films. This structure improves the strength and rigidity of the membrane electrode assembly, which suppresses deformation by a stress and can prevent a resulting breakage.

DETAILED DESCRIPTION

Hereinafter, embodiments of the membrane electrode assembly for the polymer electrode fuel cell of the present invention will be described more specifically based on the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
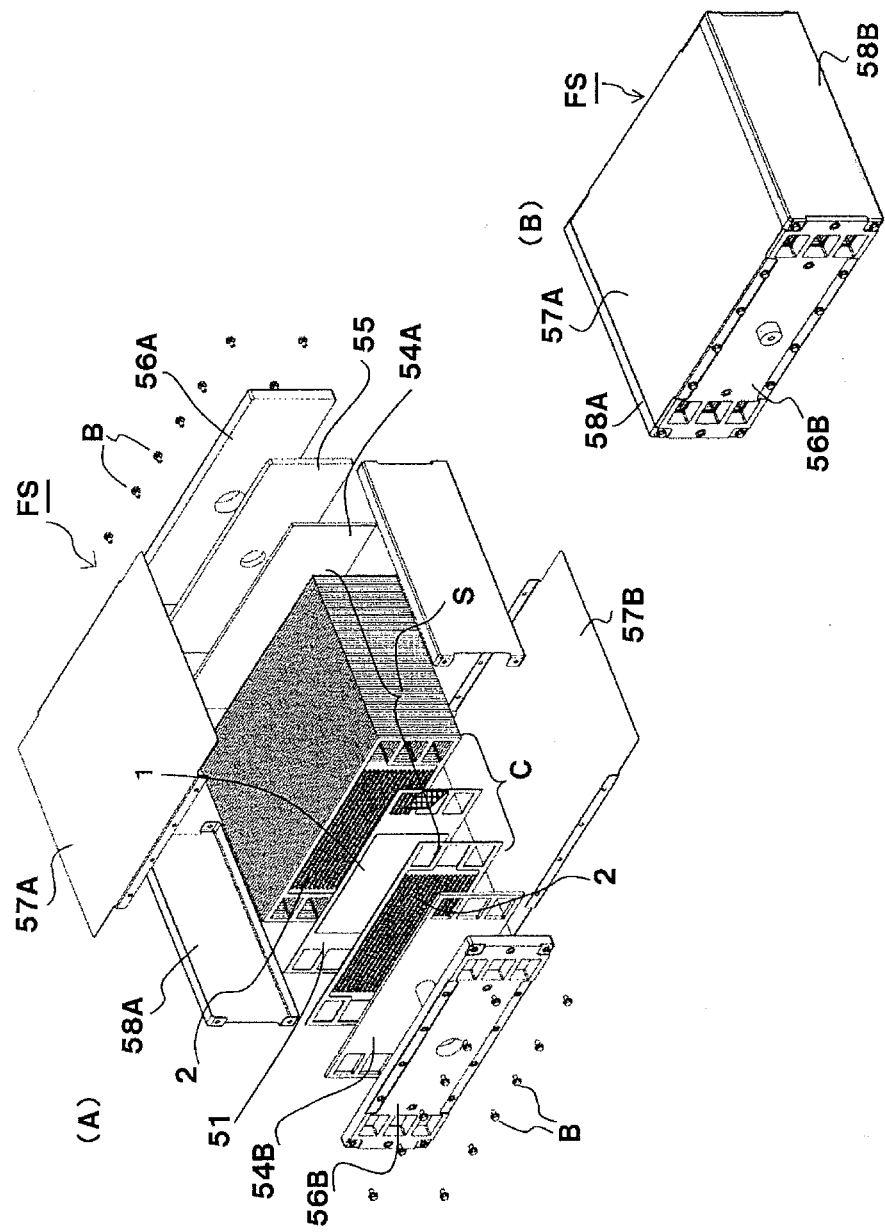
FIG. 1(A) shows an exploded perspective view illustrating a fuel cell stack that includes fuel cells of the present invention laminated together.
FIG. 1(B) shows a perspective view of the assembled fuel cell stack.

A plurality of fuel cells C (also referred to as single cells) as illustrated in FIGS. 1(A)-(B) and 2(A)-(B) are stuck together to form a fuel cell stack FS as illustrated in FIGS. 1(A)-(B).

As illustrated in FIG. 1(A), the fuel cell stack FS includes an end plate 56A on one end in the laminate direction (right end in FIGS. 1(A)-(B)) of a laminate S of the fuel cells C via a current collector plate 54A and a spacer 55, and an end plate 56B on the other end via a current collector plate 54B. The fuel cell stack FS further includes fastening plates 57A, 57B on two faces of the laminate S corresponding to the long sides of the single cells C (upper and lower faces in FIGS. 1(A)-(B)), and reinforcing plates 58A, 58B on two faces corresponding to the short sides of the single cells C.

In the fuel cell stack FS, the fastening plates 57A, 57B and the reinforcing plates 58A, 58B are coupled to both end plates 56A, 56B by bolts B. As described above, the fuel cell stack FS has a structure integrated with a case as illustrated in FIG. 1(B), where the laminate A is restrained and pressed in the lamination direction so that a predetermined contact pressure is applied on each single cell C. With this structure, the gas sealing and the electrical conductivity are maintained at high level.

Figure 2:
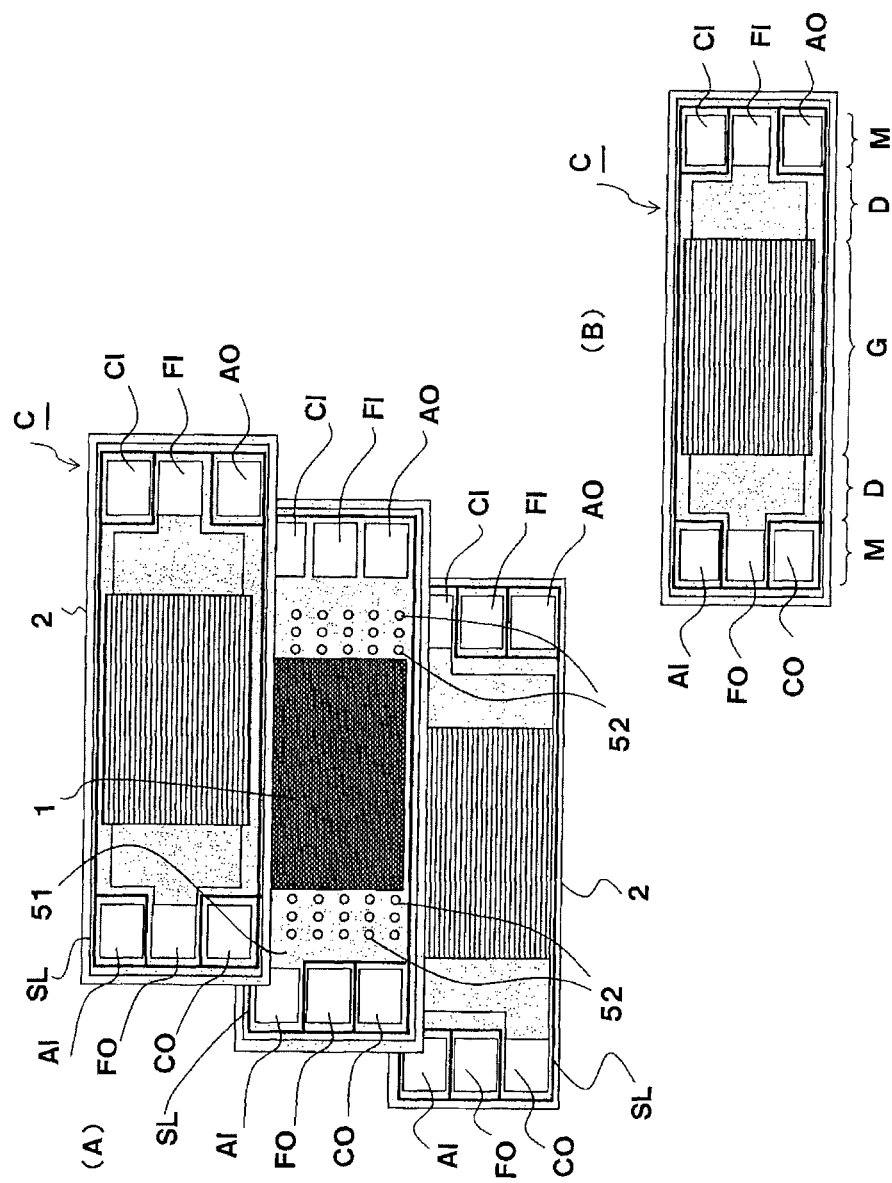
FIG. 2(A) shows an exploded plan view illustrating an embodiment of the fuel cell of the present invention.
FIG. 2(B) a plan view of the assembled fuel cell.

As illustrated in FIGS. 2(A)-(B), each fuel cell C includes a membrane electrode assembly 1 with a frame 51 at the rim, and a pair of separators 2, 2 that form cathode and anode gas channels (GC, GA) between the frame 51 and the membrane electrode assembly 1. In each fuel cell C, the flow directions of the two gas channels (GC, GA) are opposed to each other.

The membrane electrode assembly 1 is typically configured such that an electrolyte layer 10 of a solid polymer is sandwiched between a pair of electrode layers. One of the electrode layers includes an electrode catalyst layer 11a in contact with the electrolyte layer 10 and a gas diffusion layer (GDL) 12a disposed on the outer side of the electrode catalyst layer 11a. Similarly, the other of the electrode layers includes an electrode catalyst layer 11b and a gas diffusion layer 12b (see FIG. 3).

The frame 51 is integrally formed with the membrane electrode assembly 1 by resin molding (e.g. injection molding). In this embodiment, the frame 51 has a rectangular shape with the membrane electrode assembly 1 at the center. Along each short side of the frame 51, three manifold holes are arranged. The areas between each set of manifold holes and the membrane electrode assembly 1 serve as diffusers D. The frame 51 and the two separators 2, 2 all have a rectangular shape having approximately the same dimension.

As illustrated in FIGS. 2(A)-(B), the frame 51 further includes a plurality of round protrusions 52 that are arranged in a matrix in the diffusers D. When the single cell C deforms in the thickness direction due to change of the membrane electrode assembly 1 over time or the like, these protrusions 52 come in contact with the separators 2, 2 to secure the space for the flow of reactive gas.

The separators 2 are metal plates in which one plate has reversed faces to those of the other plate. For example, the separators 2 are made of stainless steel, and may be formed in any suitable shape by press working. The separators 2 of the figure have an uneven cross-sectional shape at least in the center part corresponding to the membrane electrode assembly 1. The uneven cross-sectional shape of the separators 2 continues in the length direction. The apexes of the corrugation are in contact with the membrane electrode assembly 1 while the bottoms of the corrugation form the cathode and anode gas channels (GC, GA) between the bottoms and the membrane electrode assembly 1. Further, each separator 2 has manifold holes similar to those of the frame 51 at both ends.

The frame 51 and membrane electrode assembly 1 and the two separators 2, 2 are laminated together to form the fuel cell C. In this case, the single cell C includes a power generating area G at the center as illustrated particularly in FIG. 2(B), which corresponds to the area of the membrane electrode assembly 1. Further, at both sides of the power generating area G, the single cell C includes manifold portions M to supply and discharge the reactive gas and the diffuser portions D that are flow paths of the reactive gas from the manifold portions M to the power generating portion G.

The manifold holes in the manifold portion M on the left side of FIG. 2(B) are holes for supplying the anode gas (AI), discharging cooling fluid (FO) and discharging the cathode gas (CO) from the top. The manifold holes are communicated with other manifold holes in the lamination direction to form respective channels. Further, the manifold holes in the manifold portion M on the right side of FIG. 2(B) are holes for supplying the cathode gas (CI), supplying the cooling fluid (FI) and discharging the anode gas (AO) from the top. The manifold holes are communicated with other manifold holes in the lamination direction to form respective channels.

Furthermore, as illustrated in FIGS. 2(A)-(B), the fuel cell C includes gas seals SL between the rims of the frame 51 and each separator 2 and in the surroundings E of the manifold holes. If a plurality of the fuel cells C are stuck together, the gas seals SL are provided also between the fuel cells C, i.e. between adjacent separators 2. These gas seals SL hermetically separate flow paths of the cathode gas, the anode gas and the cooling fluid from each other in the gaps between the layers. Further, the gas seals SL around the manifold holes have openings at suitable positions so that predetermined fluid can flow through the gaps between the layers.

The fuel cell C with the above-described configuration generates electric power by electrochemical reaction when one of the electrode layers of the membrane electrode assembly 1 is supplied with the cathode gas (oxygen-containing gas, air) and the other of the electrode layers is supplied with the anode gas (hydrogen-containing gas).

That is, in the anode electrode of the fuel cell C, an anode catalyst in an anode electrode catalyst layer causes a reaction to convert hydrogen ($H_2$) to proton ($2H^+$). The proton ($2H^+$) migrates through the electrolyte layer 10 to the cathode along with water ($H_2O$). In the cathode electrode, a cathode catalyst causes a reaction of the proton ($2H^+$) with oxygen ($O_2$) to produce water ($H_2O$). Further, the water ($H_2O$) produced in the cathode electrode partly migrates through the electrolyte layer 10 to the anode electrode.

Figure 3:
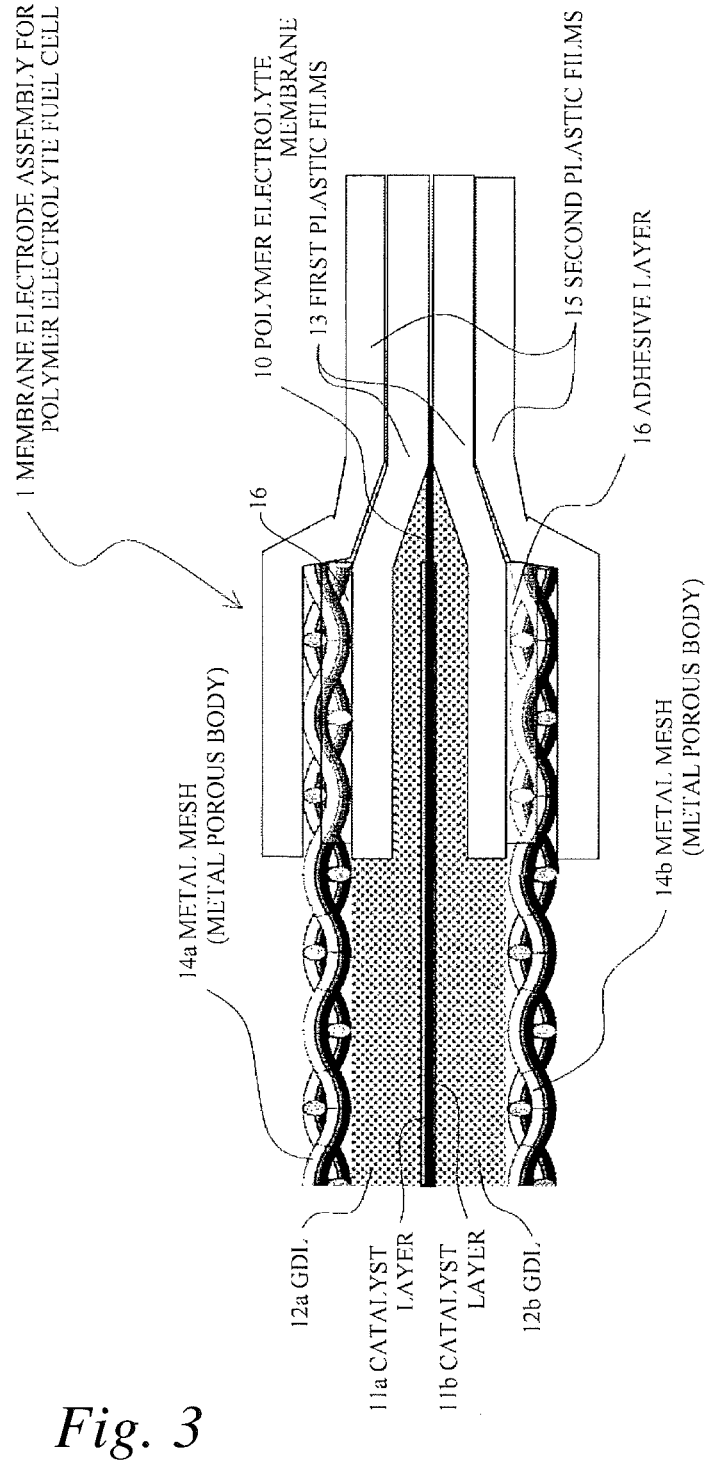
FIG. 3 is a cross sectional view illustrating a major structure of the membrane electrode assembly for the polymer electrode fuel cell of the present invention.

FIG. 3 is a cross sectional view illustrating the major structure of the membrane electrode assembly for the polymer electrolyte fuel cell of the present invention.

The membrane electrode assembly (MEA) 1 includes the polymer electrolyte membrane 10 with the catalyst layers 11a and 11b on both sides, i.e. a catalyst coated membrane (CCM), at the center portion. The CCM is sandwiched between a pair of the gas diffusion layers (GDLs) 12a and 12b.

At the rim portions of the GDLs 12a and 12b that holds the CCM between them, the first plastic films 13 are attached to cover and seal the end edges of the CCM and the GDLs 12a, 12b.

The polymer electrolyte membrane 10 has a function of selectively transmitting proton produced in the anode electrode layer to the cathode electrode layer in the thickness direction when the PEFC is in operation. The polymer electrolyte membrane 10 also serves as a barrier wall to prevent fuel gas supplied to the anode from being mixed with oxidant gas supplied to the cathode.

The polymer electrolyte membrane may be a generally-used perfluorosulfonic acid electrolyte membrane or a hydrocarbon electrolyte membrane. Such perfluorosulfonic acid electrolyte membranes include, for example, perfluorocarbon sulfonic acid polymers such as NAFION (registered trademark, DuPont Corp.), ACIPLEX (registered trademark, Asahi Kasei Corp.) and FLEMION (registered trademark, Asahi Glass Co., Ltd.), perfluorocarbon phosphonic acid polymers, trifluorostyrene sulfonic acid polymers, ethylene tetrafluoroethylene-g-styrene sulfonic acid polymers, ethylene-tetrafluoroethylene copolymer, polyvinylidene fluoride-perfluorocarbon sulfonic acid polymers and the like.

Further, such hydrocarbon polymer electrolytes include, for example, sulfonated polyether sulfone (S-PES), sulfonated polyaryletherketone, sulfonated polybenzimidazole alkyl, phosphonated polybenzimidazole alkyl, sulfonated polystyrene, sulfonated polyetheretherketone (S-PEEK), sulfonated polyphenylene (S-PPP) and the like.

The thickness of the polymer electrolyte membrane 10 is not particularly limited, and may be suitably determined according to the properties of the fuel cell. However, the thickness is normally approximately from 5 to 300 μm. With the polymer electrolyte membrane having a thickness within this numerical range, a good balance is achieved among the strength in film forming, the durability in use and the output properties in use.

The electrolyte layers 11a, 11b are formed by mixing a catalyst component supported by a conductive catalyst support with perfluorosulfonic acid electrolyte solution or hydrocarbon electrolyte solution. If necessary, a water repellant agent or a pore forming agent may be added.

Specifically, examples of such catalyst components include metals such as platinum (Pt), ruthenium (Ru), iridium (Ir), rhodium (Rh), palladium (Pd), osmium (Os), tungsten (W), lead (Pd), iron (Fe), chromium (Cr), cobalt (Co), nickel (Ni), manganese (Mn), vanadium (V), Molybdenum (Mo), gallium (Ga) and aluminum (Al), and the alloys thereof.

Among them, catalysts containing at least platinum are preferably used in order to improve the catalyst activity, the resistance to catalyst poisoning caused by carbon monoxide etc. the heat resistance and the like. With regard to the composition, it is preferred that such alloys contain platinum in the amount of from 30 to 90 atom % although it depends on the metal components of alloys.

The catalyst support may be made of any material as long as it has a specific surface area enough to support the catalyst component in a desired dispersed condition and also has sufficient electron conductivity. Specifically, such catalyst supports include carbon black such as oil-furnace black, acetylene black, thermal black and channel black, carbon particles of activated carbon, coke, natural graphite and artificial graphite, and the like.

The gas diffusion layers 12a, 12b has a function of promoting diffusion of the fuel gas and the oxidant gas to the electrode layers, which are supplied through the respective gas channels (fuel gas channel, oxidant gas channel) formed between the gas diffusion layers 12a, 12b and the separators (not shown). The gas diffusion layers 12a, 12b also serves as an electron-conducting path, and are made of a carbon material such as carbon paper and carbon cloth. The gas diffusion layers may be microporous layers.

The term microporous layer (MPL) means a coating layer that is mainly composed of a water-repellant resin such as polytetrafluoroethylene (PTFE) and an electrically conductive material such as carbon black.

By using a microporous layer for the entire GDLs or for the part of the GDLs at the side of the electrolyte membrane, the GDLs acquire a function of suppressing flooding by allowing the electrolyte membrane to hold water or by removing excess water in the MEA.

The plastic films 13 for sealing the peripheral edges of the CCM and GDLs 12a, 12b may be made of any material including materials known in the art as long as it is impermeable to the fuel gas and the oxidant gas.

Such resin materials include, for example, polyethylenenaphthalate (PEN), polyethylenetelephthalate (PET), polytetrafluoroethylene (PTFE), polyvinylidene fluoride (PVDF) and the like.

Next, the metal porous bodies 14a and 14b are disposed on the entire front and back faces of a laminate in which the CCM (electrolyte membrane 10 and catalyst layer 11a, 11b) and the GDLs 12a, 12b are laminated together and the rim portion is further covered with the plastic films 13.

Then, the second plastic films 15, which is made of the same material as described above, are attached on the rim portion of the metal porous bodies 14a, 14b that are laminated on both faces of the laminate, so as to cover and seal the end edges of the metal porous bodies 14a, 14b in combination with the previously attached first films 13.

In the embodiment of the membrane electrode assembly of FIG. 3, the metal porous bodies 14a, 14b are made of a metal mesh. However, the metal porous bodies are not limited thereto. In addition to metal mesh, materials that may be used include, for example, metal foam, expanded metal, punching metal, etching plate, precision pressed plate, metal mesh, sintered metal fiber, metal non-woven and the like.

The plastic films 13 and 15 may be attached by thermocompression bonding or the like. However, depending on the material, an adhesive layer 16 made of a thermoplastic resin or the like may be provided between the plastic films or between the plastic film and the GDLs or the metal porous bodies in order to improve the adhesion between them. Further, for the same purpose, adhesive-backed films, e.g. laminate sheets, may also be used as the plastic films.

A plurality of the membrane electrode assemblies 1 are stuck and fixed together via the separators having the channels for the fuel gas and the oxidant gas to form the fuel cell stack, and the fuel cell stack is assembled in a suitable case to form the polymer electrolyte fuel cell.

In the membrane electrode assembly 1, the highly gas-permeable metal porous bodies 14a and 14b disposed on the surfaces of the GDLs 12a and 12b can serve as a part of the gas diffusion layers, and can thereby improve the strength of the gas diffusion layers without increasing the thickness. This rigid membrane electrode assembly 1 deforms little even if the stress applied thereon increases, which can suppress breakage of the membrane electrode assembly 1, especially breakage of the electrolyte membrane 10, and can therefore improve the useful life.

Further, the second plastic films 15 covering the end edges of the metal porous bodies 14a, 14b can prevent corrosion from the edge portions and resulting degradation of the performance. Furthermore, the second plastic films 15 can also prevent the metal porous bodies from unraveling from the end, which can prevent a short circuit caused by a loose wire (particularly if they are made of a metal mesh).

Moreover, the metal porous bodies 14a, 14b are assembled with the laminate of the CCM (electrolyte membrane 10, catalyst layers 11a, 11b) and the GDLs 12a, 12b, that have been already covered with the first plastic films 13 at the rim portions. Therefore, a loose wire is prevented from digging into the CCM or the GDLs to cause short circuit or breakage (piercing) of the electrolyte membrane 10.

While the embodiments of the membrane electrode assembly for the polymer electrolyte fuel cell according to the present invention are described, the membrane electrode assembly of the present invention is not limited to the above-described embodiments, and it should be understood that details of the configuration may be suitably changed without departing from the gist of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 membrane electrode assembly (MEA) for polymer electrolyte fuel cell
10 polymer electrolyte membrane
11 catalyst layer
11a, 11b catalyst layer
12a, 12b gas diffusion layer (GDL)
13 first plastic film
14a, 14b metal mesh (metal porous body)
15 second plastic film
16 adhesive layer

The invention claimed is:

1. A membrane electrode assembly for a polymer electrolyte fuel cell, comprising:
   a laminate comprising a polymer electrolyte membrane with catalyst layers on both sides, gas diffusion layers that hold the polymer electrolyte membrane between the gas diffusion layers, and a first plastic film that covers a rim portion of the polymer electrolyte membrane, the catalyst layers and the gas diffusion layers; metal porous bodies disposed on both entire faces of the laminate; and
   a second plastic film that further covers a rim portion of the laminate and the metal porous bodies that are laminated together,
   wherein rim portions of the metal porous bodies are held between the first plastic film and the second plastic film.

2. The membrane electrode assembly for the polymer electrolyte fuel cell according to claim 1, further comprising an adhesive layer that is interposed between the metal porous bodies and the first and second plastic films.

3. The membrane electrode assembly for the polymer electrolyte fuel cell according to claim 1, further comprising an adhesive layer that is interposed between the first and second plastic films.

4. The membrane electrode assembly for the polymer electrolyte fuel cell according to claim 1, wherein the gas diffusion layers are microporous layers.

5. A polymer electrolyte fuel cell, comprising the membrane electrode assembly according to claim 1.

6. The membrane electrode assembly for the polymer electrolyte fuel cell according to claim 2, further comprising an adhesive layer that is interposed between the first and second plastic films.

7. The membrane electrode assembly for the polymer electrolyte fuel cell according to claim 2, wherein the gas diffusion layers are microporous layers.

8. The membrane electrode assembly for the polymer electrolyte fuel cell according to claim 3, wherein the gas diffusion layers are microporous layers.

9. A polymer electrolyte fuel cell, comprising the membrane electrode assembly according to claim 2.

10. A polymer electrolyte fuel cell, comprising the membrane electrode assembly according to claim 3.

11. A polymer electrolyte fuel cell, comprising the membrane electrode assembly according to claim 4.

* * * * *